INVENTOR.
SIDNEY LEVINE

ATTORNEYS

United States Patent Office 3,442,052
Patented May 6, 1969

3,442,052
SEALING BAR FOR SLIDING GLASS DOOR UNITS
Sidney Levine, Stoneham, Mass., assignor to American Aluminum Window Corp., Malden, Mass., a corporation of Massachusetts
Filed May 2, 1967, Ser. No. 635,602
Int. Cl. E05d 13/02
U.S. Cl. 49—425                                                7 Claims

ABSTRACT OF THE DISCLOSURE

A sealed movable glass door unit includes a frame having a sill with an upwardly projecting rib on which roller wheels bear for supporting movable panel, door or sash. The movable part has a channel-shaped bottom edge in which a sealing bar is slidably received. The wheels are supported in cam links that are adjustably pivoted and engageable with the sealing bar. Adjustment of a link to raise or lower the movable part in relation to the frame correspondingly raises or lowers the sealing bar in relation to the movable part or door to maintain a constant engagement between the sealing bar and the frame.

Background of the invention

This invention relates generally to framed structural units including slidable or otherwise movable panels, sashes or doors, hereinafter referred to for convenience simply as doors. It relates more particularly to such structures for use in exterior walls exposed to the weather, or other applications where the door is to be sealed to the sill of the frame upon which it moves.

Existing door units have rollers or wheels for supporting the weight of the door and permitting its movement along a track or rib projecting upwardly from the frame sill. It has also been proposed, as in the patent to Le Bon No. 2,668,318, to mount the wheels upon adjustable pivotal supports, such supports being pivoted on the bottom rail of the door and adapted to move the axes of the wheels vertically in relation to the door for the purpose of leveling it within the frame and to align the stiles of the door in relation to the jambs. Such adjustments produce a clearance space of variable height between the sill and the bottom rail of the door, allowing water to flow or to be blown by the wind into the interior of the structure. To prevent this, various means have been employed in an effort to provide an effective weatherstrip to seal the clearance space, and such means are necessarily required to accommodate the foregoing height adjustments.

The devices hitherto employed have been unsatisfactory because they are either restrictive as to the type of weatherstripping that may be employed, or require spring-operated mechanisms that may become broken or jammed and thereby rendered ineffective. Such means also frequently give an unsightly appearance to the assembled unit. Also, the parts of such weatherstripping devices are often in a position where they may be damaged by a person inadvertently kicking the same with a foot, and in a position exposed to the corrosive and icing effects of the atmosphere and weather.

Summary of the invention

This invention solves the foregoing problems by using the wheel height adjusting mechanism to vary the position of a sealing or weatherstripping bar in relation to the door. By this means a given height adjustment of the door relative to the frame produces an equal adjustment in the position of said bar relative to the door. As a result, there is no net change in the position of the bar relative to the frame. These means provide effective weatherstripping without any adjustments other than that of the wheel height, and permit the use of various desirable types of sealing means such as nylon pile strips and the like.

The foregoing advantages are realized, according to this invention, by the use of simple and rugged means that are not only durable in structure but also well protected from the weather and invisibly housed within the lower rail of the door.

Description of the preferred embodiment

Figure 1:
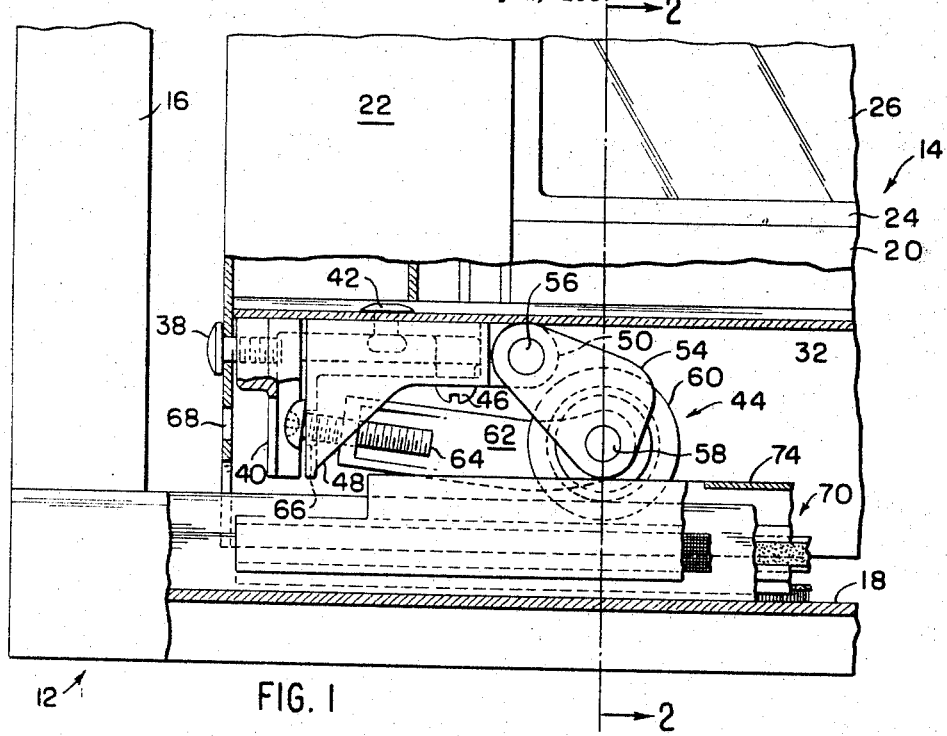
FIG. 1 is a fragmentary elevation, partly in section of a preferred embodiment.
Figure 2:
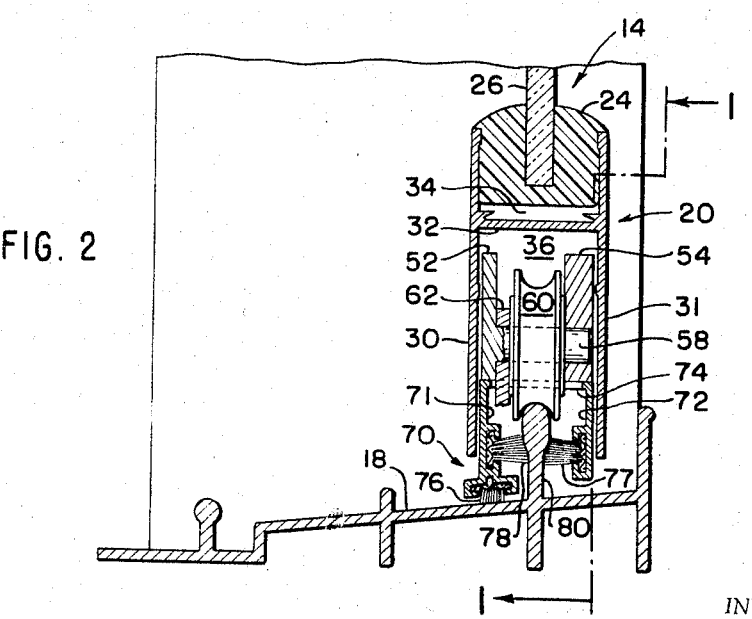
FIG. 2 is an elevation in section taken on line 2—2 of FIG. 1.

The preferred embodiment of the invention, as illustrated in the drawings, comprises an extruded frame 12 of aluminum or other suitable metal, and two or more doors and panels of which only a single door designated generally at 14 is illustrated. The door 14, when assembled in the frame 12, is movable while other panels, not shown, are fixed in the frame.

The frame 12 comprises the usual head member at the top, not shown, spaced jambs 16 and a sill 18, and may be identical to the frame disclosed in applicant's copending application Ser. No. 635,503 filed on even data herewith under the title, "Sill Lock for Stationary Panel of Sliding Glass Door Units." The frame members are preferably formed as extrusions having channels or tracks with upstanding ribs within which the door and panels are received. Details of the structure of the frame have been omitted from the drawing as the present invention is concerned only with the structures and interrelationships of the door 14 and the sill 18.

The door 14 includes the usual top rail, not shown, a bottom rail 20 and spaced stiles 22, these parts also being extruded and having the usual grooves, ribs and channels defining a receptacle for receiving a vinyl or rubber glazing strip 24 for a glass plane 26.

Referring more particularly to the bottom rail 20, this member comprises a pair of opposed exterior and interior side walls 30 and 31, respectively connected by a continuous web 32 defining a glass receiving channel 34 and a guide channel 36.

The stiles 22 and the top rail of the sash are fastened together in a conventional manner, as by screws, not shown. The stiles and the bottom rail are fastened together by means of a screw 38 passing through a hole in the stile and threaded into an L-shaped bracket 40, the bracket being securely and permanently fastened to the web 32 by a blind rivet 42.

An adjustable roller wheel assembly designated generally at 44 is secured to the bracket 40 by means of a screw 46 threaded into the bracket. This assembly includes a member 48 having spaced flanges fitting over the bracket and a hole to receive the screw 46 which holds the member 48 against the bracket in a rigid manner. The member 48 has a boss 50 to which a pair of cam links 52 and 54 are pivotally connected by a pin 56. A second pin 58 passes through these links and also the inner race of a ball bearing roller wheel 60, thus pivotally supporting the wheel about the axis of the pin 58. The links have peripheral cam surfaces shaped as described below.

An adjusting link 62 is pivoted on the pin 58 between the wheel and the link 52. The link 62 is threaded to receive a panel height adjusting screw 64, the screw passing through a clearance hole 66 in the member 48, such hole being smaller than the head of the screw but larger than the outer thread diameter. An aperture in the bracket 40 aligned with a hole 68 in the stile 22 permits lateral access to the head of the screw by means of a screwdriver.

A sealing bar 70 is fitted within the channel 36, and is preferably an extrusion having side walls 71 and 72 slidably fitted within the walls 30 and 31 of the rail 20, and also a connecting wall 74 having an aperture or cutout through which the wheel 60 is freely movable. The sealing bar 70 has slots into which are received pile weatherstrips 76, 77 and 78, the strip 76 bearing upon the sill 18 and the strips 77 and 78 bearing upon the sides of a rib or track 80 upstanding from the still.

As illustrated in the drawing, the weight of the sash is supported on the rib 80, to which the weight is transferred through the height adjusting assembly 44 and the wheel 60. The head of the screw 64 bears firmly on the member 48 and restrains the links 52 and 54 from pivoting about the axis of the pin 56. At the same time, the connecting wall 74 of the sealing bar is in close proximity to the cam surfaces of the links 52 and 54, or is in light contact with said surfaces, with the strip 76 in efficient sealing contact with the sill 18. Thus, when the weight of the sash is supported through the wheel upon the rib 80, the sealing bar 70 is effectively restrained from both upward and downward movement from the position shown. Preferably, the sum of the vertical height of the wall 71 of the sealing bar and the effective height of the compressed strip 76 is slightly less than the clearance between the contacting cam surface of the link 52 and the sill 18, in order to avoid any possibility of the sash being supported with any substantial portion of its weight on the pile strip 76.

It will be understood, of course, that two wheel assemblies 44 are normally installed on each door. The foregoing dimensional relationships are maintained for all height adjustments obtainable by turning the screw 64. This results from the fact that the links 52 and 54 have their cam edges so shaped that for any given incremental change in the vertical position of the wheel axis in relation to the panel 14, an equal incremental change occurs in the vertical position of the cam surfaces of the links 52 and 54 contacting the sealing bar 70. Thus if the panel is raised by lowering the wheel in relation to the door, the cam surfaces of the links 52 and 54 are lowered an equal distance, thereby lowering the sealing bar 70 an equal distance in relation to the door and maintaining the original efficient contact between the weatherstrip 76 and the sill 18.

It will be understood that while the foregoing description has reference to a preferred embodiment, various structural adaptations and relationships may be made in application of the teachings hereof to a variety of shapes of extruded or otherwise formed doors, panels, sashes and related frame sill members. Such employment of the principles of this invention as would occur to one skilled in this art are, to the extent covered by the appended claims, within the spirit and scope of this invention.

I claim:
1. A sealed movable panel closure including the combination of
   a panel member having an edge defining a channel,
   a link pivotal in the channel about a first axis normal to the panel member,
   a wheel pivotal on the link about a second axis parallel to the first axis,
   screw means for adjustably fixing the pivotal position of the link in relation to the channel,
   a frame having a rib extending along the principal dimension of the channel and projecting thereinto with an edge in rolling contact with the wheel,
   and a sealing bar slidably received in the channel in engageable relation with a movable portion of the link, and provided with sealing means resiliently engaging a side of the rib.

2. The combination according to claim 1, in which the screw means include a second link pivoted on the first link about the second axis.

3. The combination according to claim 1, in which the screw means include a second link pivoted on the first link about the second axis, and a screw adapted to adjust the position of the second link in relation to the channel.

4. The combination according to claim 3, in which the panel member has an access aperture for insertion of a tool into rotative engagement with the screw.

5. The combination according to claim 1 in which the sealing bar has a channel shape with an opening in a wall thereof into which the wheel protrudes.

6. The combination according to claim 5, in which the bar has a pair of opposed walls provided with sealing means respectively resiliently engaging opposite sides of the rib.

7. The combination according to claim 1 in which the frame has a sill from which the rib projects and the sealing bar is provided with sealing means resiliently engageable with the sill.

References Cited

UNITED STATES PATENTS

| | | | |
|---|---|---|---|
| 2,889,585 | 6/1959 | Le Bon | 49—425 |
| 2,889,589 | 6/1959 | Peterson | 49—425 |
| 3,040,391 | 6/1962 | Saunders | 49—425 |
| 3,175,255 | 3/1965 | Saunders | 49—425 |
| 3,304,658 | 2/1967 | Kreger | 49—425 |

DAVID J. WILLIAMOWSKY, *Primary Examiner.*

J. KARL BELL, *Assistant Examiner.*